United States Patent Office.

GEORGE H. MUNROE, OF NEW YORK, N. Y.

Letters Patent No. 95,715, dated October 12, 1869.

---

IMPROVEMENT IN PRESERVING MEAT FOR PASTRY-PURPOSES.

---

The Schedule referred to in these Letters Patent and making part of the same.

---

*To all whom it may concern:*

Be it known that I, GEORGE H. MUNROE, of the city, county, and State of New York, have invented a new and useful Method of Preparing and Preserving Meat for Pastry-Purposes; and I do hereby declare the following to be a full, clear, and exact description of the same, which will enable persons skilled in the art to practise, and the public to understand my invention.

The nature of my invention consists in boiling meat in the ordinary manner, removing the bones and all inedible parts, mincing the meat, and, when cold, mixing with it heavy molasses or other thick saccharine sirup, and, without other treatment, storing the compound in barrels, boxes, cans, or in any of the ordinary packages, the system and method herein set forth being effectual in preserving the meat for any length of time.

I take boiled meat, preferably beef, and after removing the bones and other inedible portions, I chop the clear remaining parts to such a degree of fineness as to render it suitable to make into pies, when mixed with the other usual ingredients, and afterward thoroughly stir in and mingle with the minced meat a sufficient quantity of heavy molasses, or other thick saccharine sirup, to completely moisten the same, after which I pack the compound into any appropriate vessel, preparatory to shipment and sale.

To use the compound, it is only necessary to add spice, apples, brandy, vinegar, cider, or such other articles as may be desired, and the material is ready for use as a filling for pies.

The only conditions necessary to observe in the preparation of the mass are, first, to see that no excess of the saccharine sirup, beyond the amount requisite to moisten the meat, and render homogeneous and coherent the entire mass, is used; and secondly, to be careful to have the meat cold before adding the saccharine sirup.

I have found, in practice, that meat thus treated may be preserved for years uninjured.

What I claim as new, and desire to secure by Letters Patent, is—

1. Preserving meat for pastry-purposes, by the use of saccharine sirup, substantially in manner as described.

2. Meat for pastry-purposes, prepared for preservation, shipment, and use, substantially as described.

GEO. H. MUNROE.

Witnesses:
   FRANK FULLER,
   W. J. CADDLE.